Sept. 4, 1956  C. E. HUTCHINSON  2,761,565
FILTER UNITS
Filed March 19, 1954

CLYDE E. HUTCHINSON,
INVENTOR.

BY

ATTORNEY.

United States Patent Office 2,761,565
Patented Sept. 4, 1956

2,761,565

FILTER UNITS

Clyde E. Hutchinson, Venice, Calif.

Application March 19, 1954, Serial No. 417,296

3 Claims. (Cl. 210—158)

This invention relates to filter units and more particularly to a filter unit especially adapted for use with aquariums in which ornamental species of fish of miniature size are kept.

The filter unit herein disclosed and claimed is particularly adapted for use with the aquarium cleaning device of my co-pending application Ser. No. 169,056 now Patent 2,672,987, of which this application is a division, although it is not necessarily limited to such use.

In filter units of the type herein shown the filtering material generally comprises a mass of loose glass fibre which may be supported on a bed of charcoal fragments which aid in the filtering operation as water is passed through the loose glass fibres on the charcoal bed. Such filtering units require cleaning from time to time and this cleaning operation at best is a messy one. The cleaning operation is simplified with the filter unit of the present invention for the filtering means preferably comprises a cartridge or pad, preferably formed of felted glass fibers, which is removably held within a body shell into which the water from the aquarium is delivered. As the filtering means is a unitary pad or cartridge, it may be easily removed from the body shell during the cleaning operation; the pad or cartridge once removed can be either cleaned by a back flushing operation or a new pad substituted for the one removed.

In the now preferred embodiment of the invention the removable pad or cartridge is stiffened by reticulated elements, one at least of which may be formed integral with the body shell in which the cartridge or pad is supported. The reticulated elements tend to hold the pad in the proper position within the body shell and also coact with a retainer element to maintain the cartridge in the desired operative position.

Figure 1:
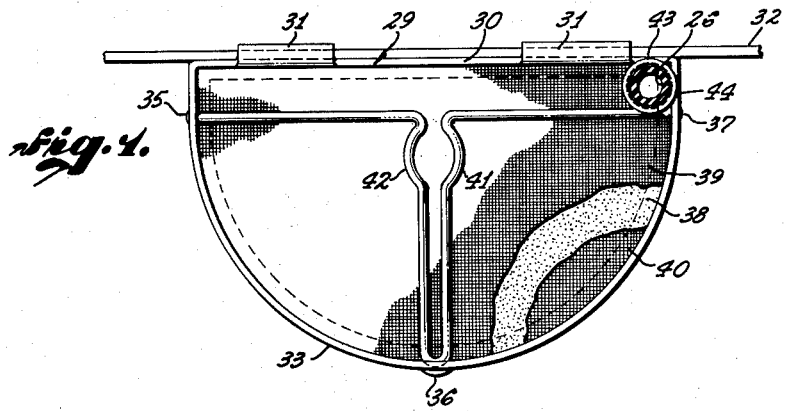
Figure 2:
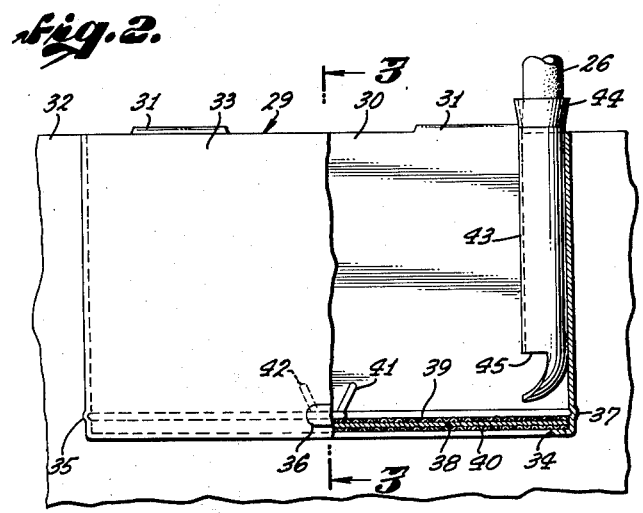
Figure 3:
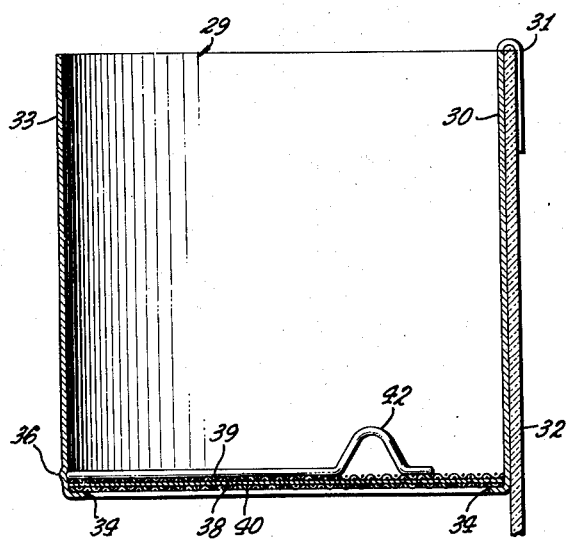

Other features and advantages of the present invention will be hereinafter apparent from the following description, particularly when taken in connection with the accompanying drawing, in which Figure 1 is a top plan view of the filter unit of the present invention with the portions broken away to more clearly illustrate the same;

Figure 2 is an elevational view of the unit with a portion of the same shown in section; and Figure 3 is a section taken along line 3—3 of Figure 2.

The filter unit of the present invention, referring now to the drawing, comprises a metal or plastic shell or body member 29 preferably semicircular in plan view as shown in Figure 1. The straight or back wall 30 may be provided with a pair of bent over clips 31 soldered, riveted, or otherwise secured to the back wall, and adapted to be supported on the wall 32 of an aquarium or other container. The bottom edge of the back wall 30 and front wall 33, in the illustrated embodiment of the invention, are inwardly turned to provide an inwardly projecting peripheral flange 34, but the bottom of the shell is open otherwise. At points 35, 36, and 37 spaced around the shell at a predetermined distance above the bottom edge thereof, outwardly directed depressions are formed of generally semispherical shape and of small radius for a purpose later explained.

A filter element is cut to fit closely in the bottom of the shell 29 and, as shown in Figure 3, is formed of a pad of felted fibres 38, preferably of the material known as "glass felt" which is made from felted glass fibres, stiffened by cut out pieces of wire or plastic screen 39 and 40, placed respectively above and below the filter pad, and supported by the flange 34. If desired, the shell can be formed with a perforated lower wall, in which case the lower screen element 40 can be eliminated.

The filter element is held firmly against the inwardly turned flange 34, or the perforated lower wall if the latter is used, by a length of stiff wire forming a retainer. One end of the wire is positioned in recess 35, the first length of the wire extending from the recess toward the center of the filter pad, a second length then being looped at right angles toward the front of the shell, the tip of the loop being located in the depression 36, and a third length of the wire thereafter being bent in line with the first length of wire and the end of the wire being located in the depression 37.

At the junction of the first and third lengths of wire with the looped second section, the wire is looped upwardly as shown at 41 and 42, the loops being bent away from one another. The filter pad assembly is kept firmly pressed against the peripheral bottom flange 34 while the wire retainer is engaged with the recesses in the filter shell walls, but by squeezing loops 41 and 42 together, the ends of the wire may be freed from the recesses 35 and 37 and the retainer then withdrawn, after which the filter assembly may be removed for cleaning or for substitution with a like assembly.

A length of tube 43 is secured to the wall of the unit, and preferably at the jointure between the back and front walls of the shell or body member 29. The upper end 44 projects sufficiently far above the body shell 29 to enable the free end of a tube 26 to be pushed onto it.

The tube 26 may be the delivery tube of an aquarium cleaning device such as illustrated in my copending application hereinabove identified or it may be the delivery tube of some other pump-like element for delivering water from the aquarium to the filter unit.

The lower end of the tube 43 is cut away on one side as shown at 45, and the uncut side is bent forward in order to spread the dirty water delivered by the tube 26 over the top of the filter assembly. When the cleaning operation is finished, the tube 26 is merely pulled free from the tube 43 if a device of my co-pending application is used, the filter pad washed and put back.

If the filter unit is used with a permanent pump-like element which continuously supplies water to the unit, the tube would be left in place until the filter pad or cartridge again required cleaning.

As the filter element of the present invention consists in the unitary pad or cartridge, the removal of a dirtied cartridge is thereby simplified for it is not necessary to pull a loose mass of fibres from the body shell as with conventional filters of this type. Furthermore, if desired, the filter pad or cartridge once removed can be discarded and a like clean cartridge substituted. In fact, the filter pad could be formed as a part of the assembly consisting of the pad and the screen or reticulated elements 39 and 40. These elements, as above described, stiffen the pad and tend to hold the same in the operative position within the body shell.

Although the now preferred embodiment of the present invention has been shown and described herein, it is to be understood that the invention is not to be limited thereto, for it is susceptible to changes in form and detail within the scope of the appended claims.

I claim:

1. A filter unit of the type described for filtering the water in an aquarium, comprising: a body shell open at the normally upper end and having at least one flat wall; means for mounting said shell within the aquarium with said flat wall facewisely engaged with the wall of the aquarium; an inturned flange carried at the normally lower end of said body shell; the free edge of said flange defining a relatively large aperture; a filter cartridge comprising a felted pad of filtering material; said cartridge being of the same size and shape as the cross sectional shape of said shell and supported on said flange; means for removably holding said cartridge against said flange; a tubular element fixed within said shell for receiving water to be filtered from the aquarium; and a deflector carried by the lower end of said tubular element for directing water passed downwardly through said tubular element onto said cartridge whereby said water is filtered and returned to the aquarium through the aperture defined by said inturned flange.

2. A filter unit as set forth in claim 1 in which said filter cartridge includes a pair of reticulated plates arranged on opposite sides of said pad for supporting and reinforcing the same.

3. A filter unit of the type described for filtering the water of an aquarium, comprising: a body shell open at the opposite ends thereof; means for mounting said shell to the one wall of the aquarium; an inturned flange carried at the normally lower end of said body shell, the free edge of said flange defining a relatively large opening; a reticulated plate removably supported by said flange and completely closing the opening defined by the free edges thereof; a pad of felted fibres supported by said plate; a second reticulated plate superimposed on said pad; means coacting with said body shell and engaged with said second plate for releasably holding the same against said pad; a tubular element mounted within said shell and fixed to the wall thereof to normally extend vertically and terminating in an upper terminal portion spaced upwardly of the normally upper edge of said body shell for receiving water from said aquarium; means on the lower end of said tubular element for deflecting water discharged downwardly therethrough onto said second plate for passage downwardly through said pad to be filtered thereby as said water returns to the aquarium through the opening defined by the free edge of said flange.

References Cited in the file of this patent

UNITED STATES PATENTS

| | | |
|---|---|---|
| 1,055,082 | Rogers | Mar. 4, 1913 |
| 1,357,867 | Holmer | Nov. 2, 1920 |
| 1,421,622 | Van Ness | July 4, 1922 |
| 1,695,306 | Wiener | Dec. 18, 1928 |
| 2,548,965 | Gaugler | Apr. 17, 1951 |